US008001568B2

(12) United States Patent
Thurston et al.

(10) Patent No.: US 8,001,568 B2
(45) Date of Patent: Aug. 16, 2011

(54) METHODS AND SYSTEMS FOR DISPLAYING RECOMMENDED CONTENT ALTERNATIVES

(75) Inventors: Nathaniel Thurston, Somerville, MA (US); Devin Hosea, Boston, MA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1799 days.

(21) Appl. No.: 10/204,841

(22) PCT Filed: May 21, 2002

(86) PCT No.: PCT/US02/16039
§ 371 (c)(1),
(2), (4) Date: Aug. 23, 2002

(87) PCT Pub. No.: WO03/073740
PCT Pub. Date: Sep. 4, 2003

(65) Prior Publication Data
US 2003/0226146 A1 Dec. 4, 2003

Related U.S. Application Data

(60) Provisional application No. 60/359,930, filed on Feb. 25, 2002.

(51) Int. Cl.
*G06F 13/00* (2006.01)

(52) U.S. Cl. ................. 725/46; 725/43; 725/45; 725/61

(58) Field of Classification Search .................... 725/38, 725/43, 45, 46, 52, 53, 61
See application file for complete search history.

(56) References Cited

U.S. PATENT DOCUMENTS

| | | | |
|---|---|---|---|
| 5,737,029 A | 4/1998 | Ohkura et al. | |
| 5,758,259 A * | 5/1998 | Lawler | 725/45 |
| 5,790,935 A * | 8/1998 | Payton | 725/91 |
| 5,798,785 A * | 8/1998 | Hendricks et al. | 725/46 |
| 5,801,747 A | 9/1998 | Bedard | |
| 5,929,932 A | 7/1999 | Otsuki et al. | |
| 6,005,597 A * | 12/1999 | Barrett et al. | 725/46 |
| 6,163,316 A | 12/2000 | Killian | |
| 6,177,931 B1 | 1/2001 | Alexander et al. | |
| 6,182,287 B1 * | 1/2001 | Schneidewend et al. | 725/48 |
| 6,400,408 B1 * | 6/2002 | Berger | 348/465 |
| 6,642,939 B1 * | 11/2003 | Vallone et al. | 715/721 |
| 2005/0166248 A1 * | 7/2005 | Blackketter et al. | 725/113 |

FOREIGN PATENT DOCUMENTS

| | | |
|---|---|---|
| WO | WO 00/33224 A1 | 6/2000 |
| WO | WO 00/49801 A1 | 8/2000 |

* cited by examiner

*Primary Examiner* — Christopher Kelley
*Assistant Examiner* — Timothy R Newlin
(74) *Attorney, Agent, or Firm* — Banner & Witcoff Ltd.

(57) ABSTRACT

In a content distribution system, in which broadcast content is distributed and provided to a television viewer, a method and apparatus for providing a compact guide display of a plurality of television show or program recommendations, optionally with descriptions, which are available and selectable for viewing by a viewer without interrupting the presently-viewed content.

31 Claims, 5 Drawing Sheets

METHODS AND SYSTEMS FOR DISPLAYING RECOMMENDED CONTENT ALTERNATIVES

PRIORITY CLAIM

The present application claims priority to co-pending Provisional Patent Application No. 60/359,930 entitled Methods and Systems for Displaying Recommended Content Alternatives, filed on Feb. 25, 2002, and having a common inventive entity.

INCORPORATION BY REFERENCE

The present application for United States Patent incorporates by reference the following commonly-owned patent applications, as if set forth in their entirety herein, for all purposes:
WO 0120481A2 {Predictive Network PCT application};
U.S. Patent Application No. 60/338,398 filed Dec. 7, 2001;
U.S. patent application entitled: "Television Program Navigation Guide" filed Dec. 5, 2001;
U.S. patent application entitled: "Method and System for Selective Initial Television Channel Display" filed Oct. 22, 2001;
U.S. patent application Ser. No. 09/969,911 filed Oct. 3, 2001;
U.S. patent application entitled: "Method and System for Parsing Purchase Information from Web Pages filed Aug. 29, 2001;
U.S. patent application Ser. No. 09/928,493 filed Aug. 13, 2001;
U.S. patent application Ser. No. 09/877,974 filed Jun. 7, 2001;
U.S. patent application Ser. No. 09/558,755 filed Apr. 21, 2001;
U.S. Patent Application No. 60/282,028 filed Apr. 6, 2001;
U.S. patent application Ser. No. 09/798,337 filed Mar. 2, 2001;
U.S. patent application Ser. No. 09/777,807 filed Feb. 5, 2001;
U.S. patent application Ser. No. 09/767,693 filed Jan. 23, 2001; and
U.S. patent application Ser. No. 09/766,377 filed Jan. 19, 2001.

FIELD OF THE INVENTION

The present invention relates generally to interfaces for use in television and other content distribution systems, which provide program selection information to a viewer, and in particular, to a method and system for displaying recommended content alternatives.

BACKGROUND OF THE INVENTION

With hundreds of TV channels and scheduled programs from which to choose, together with personal video recorder (PVR)-recorded shows, pay-per-view (PPV), video-on-demand (VOD) and other content, TV viewers and other content users are faced with a nearly overwhelming choice of entertainment and other content options.

In response, various electronic or interactive programming guide (EPG/IPG) systems have been proposed or developed to enhance TV viewers' ability to navigate through and select programming. Examples of such systems are set forth in the following U.S. and foreign patent documents, among others, the disclosures of which are incorporated herein by reference as if set forth in their entirety here:

| | |
|---|---|
| U.S. Pat. No. 6,177,931 | Alexander et al. |
| U.S. Pat. No. 6,163,316 | Killian |
| U.S. Pat. No. 6,005,597 | Barrett et al. |
| WO 0049801A1 | Yuen et al. |
| WO 0033224A1 | Yuen |

Most EPG systems are capable of generating on-screen displays of content, some in a time- and channel-based grid format. While such displays have utility, they generally do not enable users to quickly and easily find content of interest. If a viewer decides, during viewing of a first television show, that he or she is interested in alternatives, the viewer must use the remote control buttons to leave the show he or she is presently viewing and direct the system to display a list of alternatives. The viewer must therefore interrupt his or her enjoyment of the presently viewed content in order to see (or even become generally aware of) one or more alternatives.

In addition, since alternatives are not presented during viewing of the television show, the viewer must actively decide that he or she is interested in alternatives (even without knowing what alternatives are available), in order to see even a listing of alternatives.

Finally, many on-screen displays typical of the prior art (such as that shown in FIG. 2 herein) are relatively complex and potentially daunting to many viewers—and if not generated with reference to a recommendation process, populated by content of little or no interest to the viewer.

It is therefore desirable to provide methods, devices and systems that enable viewers to see descriptions of alternative content without leaving their currently-viewed television shows, and without the necessity of additional button pushes or other user interaction.

It is also desirable to provide such methods, devices and systems that constantly display a relatively simple and compact selection of alternative content, wherein the user can obtain additional information quickly and easily.

It is also desirable to provide such displays based on top recommendations of content likely to be of greatest interest to the current viewer.

SUMMARY OF THE INVENTION

In view of the aforementioned drawbacks of the prior art, one aspect of the present invention provides methods, devices and systems for enabling a compact overlay display of a number of top recommendations (optionally with descriptions) that a viewer can see, and from which the viewer can select, without leaving his or her presently-viewed content.

BRIEF DESCRIPTION OF THE DRAWING FIGURES

Features and advantages of the present invention will become apparent to those skilled in the art from the description below, with reference to the following drawing figures, in which.

DESCRIPTION OF PREFERRED EMBODIMENTS

Prior Art Systems: The structure and operation of conventional EPG and IPG systems, as well as associated television systems, Internet systems, and subscriber devices, including set-top boxes (STBs), monitors, pointing devices, TV remote controls, and other control devices, are well-known in the art. Examples are set forth in the U.S. and foreign patent documents listed above, the teachings of which are incorporated herein by reference as if set forth herein in their entirety.

Figure 1:
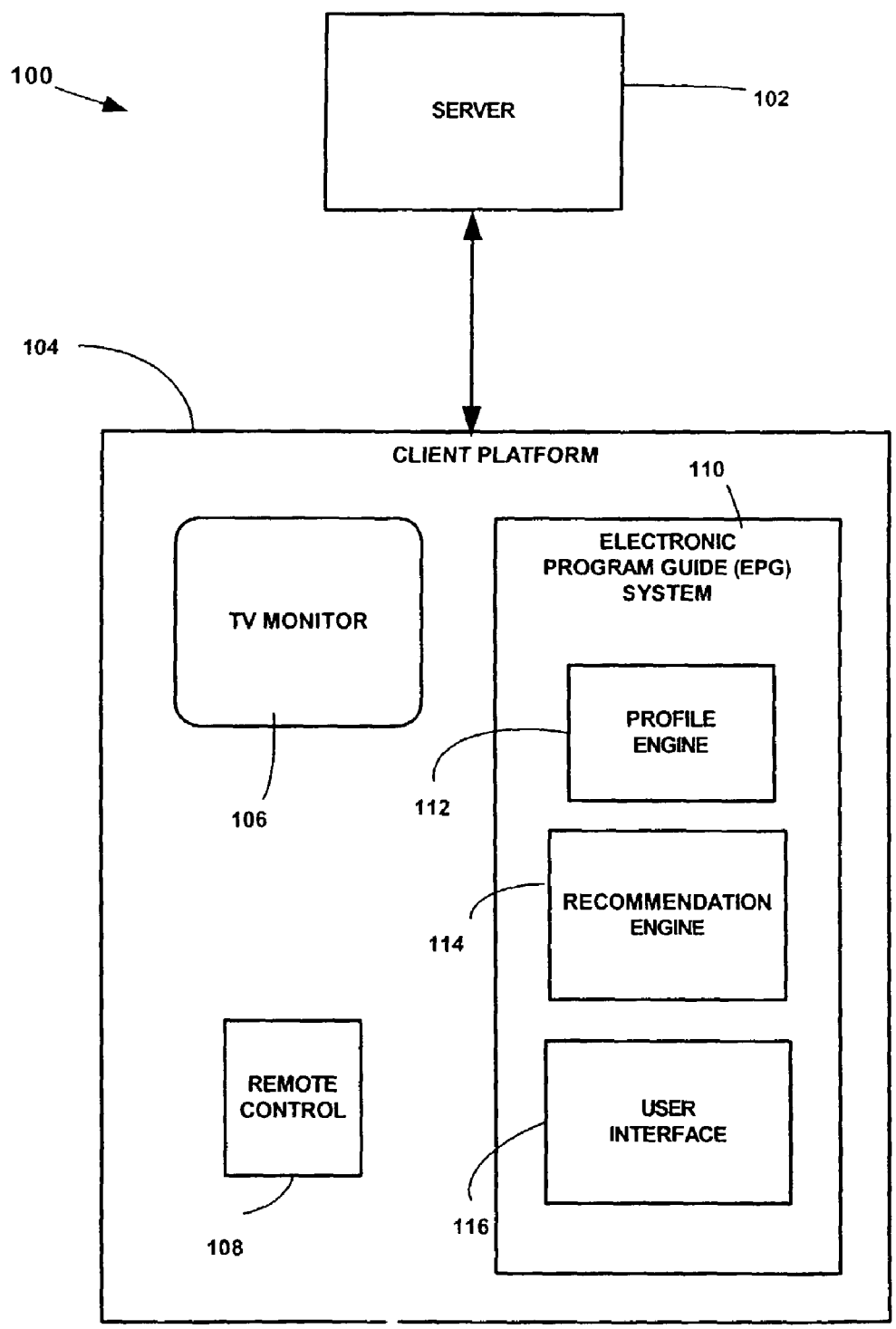
FIG. 1 is a block diagram of a prior art content distribution system.

FIG. 1 illustrates a conventional content delivery system 100. The content delivery system 100 includes a server 102 for providing program content to a client platform 104. The client platform 104 includes a television monitor 106 for viewing program content, a remote control unit 108 for selecting and controlling program content, and an electronic program guide (EPG) or interactive program guide (IPG) system 110. Within the EPG system 110, there is shown a profile engine 112, a recommendation engine 114, and a user interface (UI) 116.

In a conventional EPG or IPG 110 like that shown in FIG. 1, the recommendation engine 114 rates each television show or other content available for viewing, using known methods described in the U.S. and foreign patent documents incorporated herein by reference. In particular, the recommendation engine 114 may use profile information made available by profile engine 112 to generate the ratings or recommendations. One or more user interfaces 116 make use of these ratings to assist the viewer in finding desired programming, often by generating ordered, ranked lists of shows and giving preferred placement within such lists to shows with higher ratings. The lists are then displayed to viewers using known user methods and devices in the UI layer 116. Many viewers rely on the ordered, ranked lists generated by such EPGs to select programs to be viewed. By way of example, using some prior art systems, a viewer might select an option such as "show highest ranked Sports program" for his or her next one-hour segment of viewing.

One drawback of on-screen displays typical of the prior art, however, is that if a viewer decides, during viewing of a first television show, that he or she is interested in alternatives, the viewer must use the remote control buttons to leave the show he or she is presently viewing and direct the system to display a list of alternatives. The viewer must therefore interrupt his or her enjoyment of the presently-viewed content in order to see (or even be generally aware of) one or more alternatives. In addition, since alternatives are not presented during viewing of the television show, the viewer must actively decide that he or she is interested in alternatives in order to see them at all. Viewers might therefore miss a program of greater interest than the currently viewed program.

Figure 2:
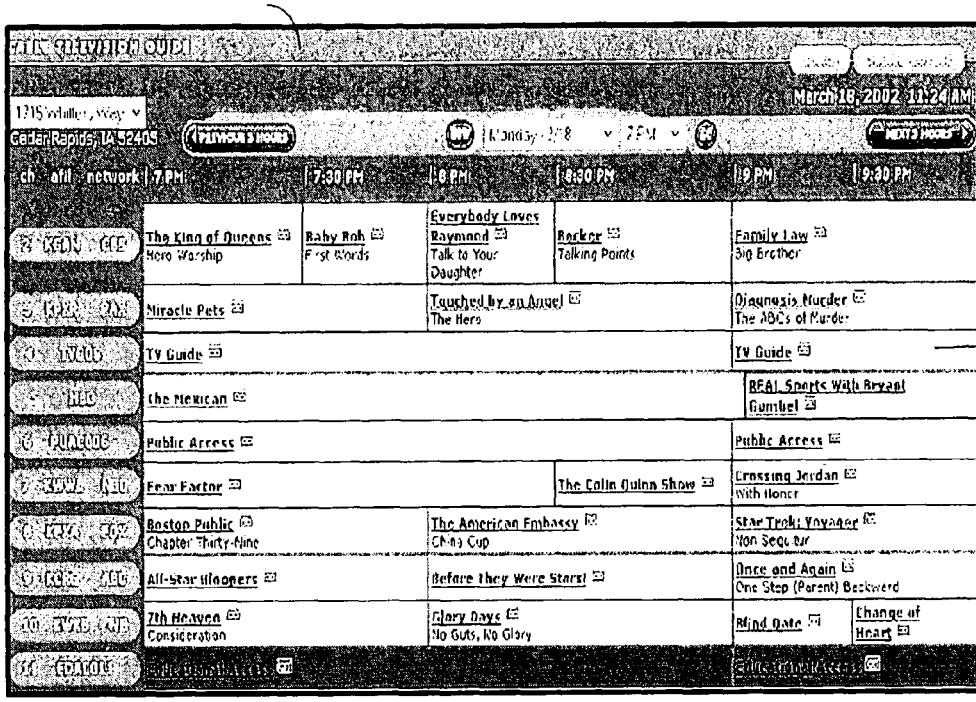
FIG. 2 is a drawing showing a typical screen display generated by a prior art EPG system.

FIG. 2 shows a typical on-screen display 120 as found in the prior art. The on-screen display presents program information in a grid format 122, which is relatively complex and potentially daunting to many viewers, and if not generated with reference to a recommendation process, such as by the recommendation engine 114 in FIG. 1, the on-screen display 120, may be populated by content of little or no interest to the viewer.

Figure 3:
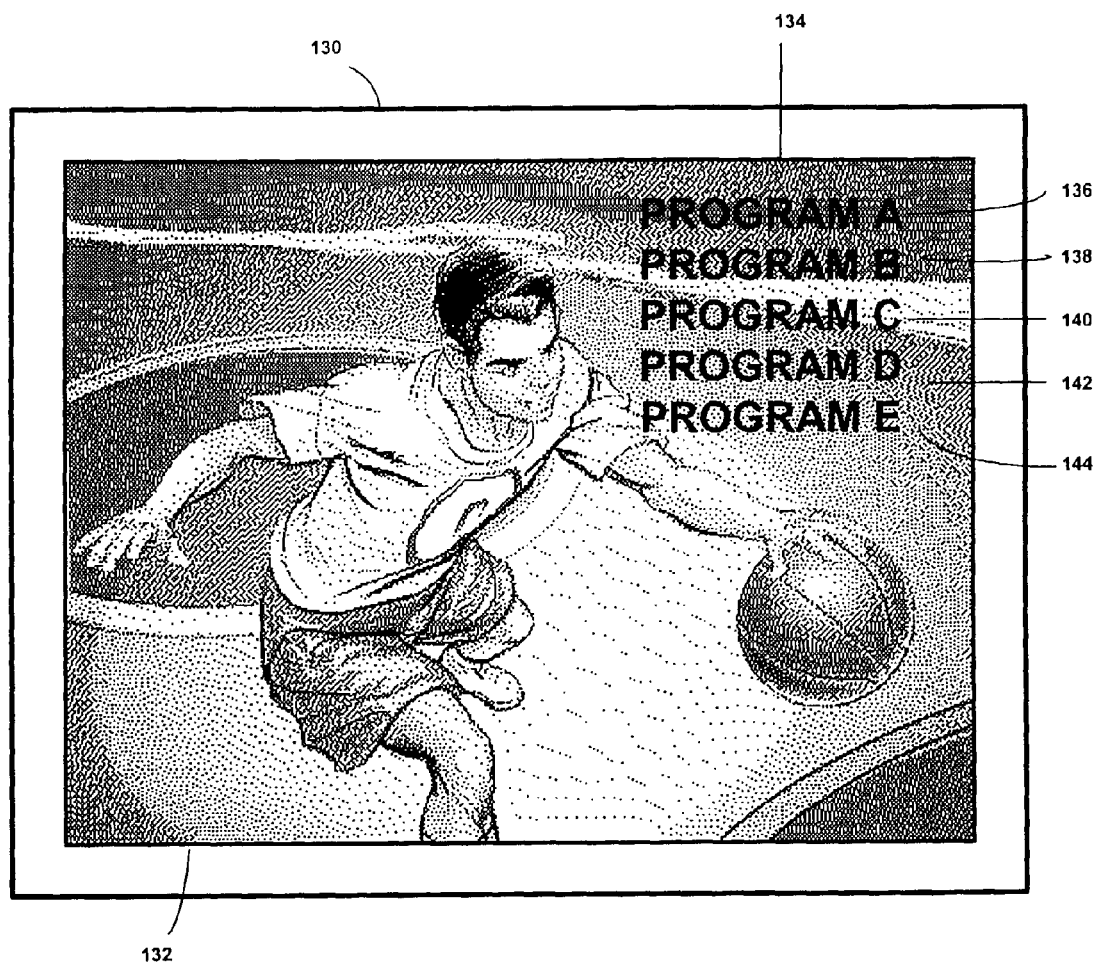
FIG. 3 depicts a screen display generated by the system embodying the present invention.

Present Invention: Accordingly, as shown in FIG. 3, one embodiment of the present invention takes the form of a compact guide display 134 that allows viewers to see listings of a number of names and descriptions of top recommendations without leaving the show they are currently viewing. In FIG. 3, a display unit 130 is displaying content 132 to a viewer. In this case, the viewer is watching a basketball game. A compact guide display 134 is illustrated as a screen overlay, which displays five recommendations (136, 138, 140, 142, 144) for available alternative viewing.

Figure 4:
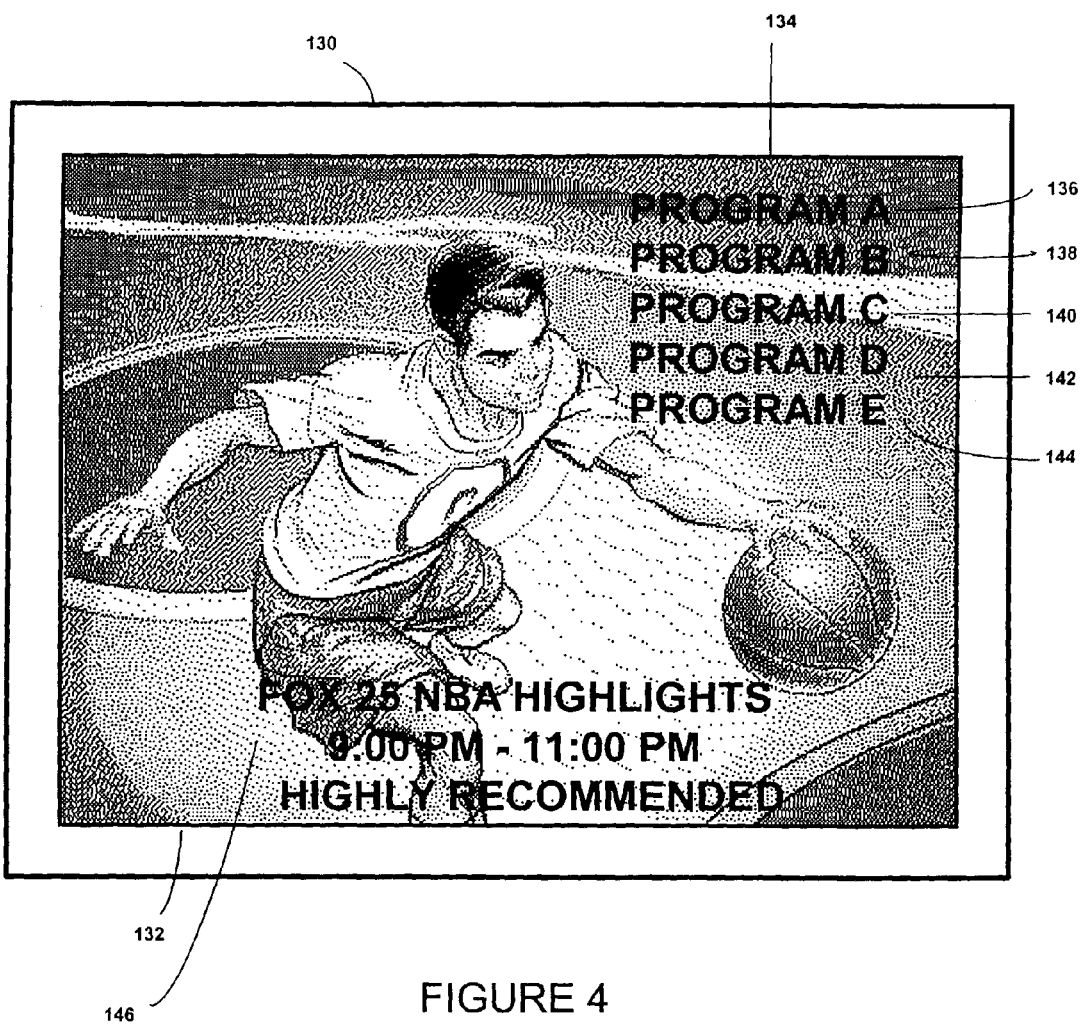
FIG. 4 depicts a screen display, as taught in the present invention, in which the choice of a content alternative displays more detailed information about the content alternative.

Using the remote control unit 108, a user may click on any of the recommendations (136, 138, 140, 142, 144) to either instantly begin viewing the selected content or view additional information about the alternatives. FIG. 4 illustrates the latter instance, where a user has selected one of the program recommendations (136, 138, 140, 142, 144) and the system has responded by displaying additional information 146 about the selected program. Alternatively, users can hover the cursor over a listing to obtain additional information 146. In another practice of the invention, clicking or hovering can open a picture-in-picture window providing instant viewing of the alternative content while allowing the viewer to continue to view current content.

The compact guide display 134 could be displayed at all times during program viewing as a translucent or opaque overlay; it could be placed at the top, bottom or side of the screen; it could be set to toggle on or off in response to pressing of a remote control button; or it could be set to be displayed from time-to-time or periodically during a viewing session.

The compact guide display 134 could show top recommendations across all content, or across a single genre. It could receive its recommendations from a conventional rating or recommendation engine 114. The recommendation engine 114 could use user profiles to determine appropriate recommendations for the user.

In addition, the compact guide 134 could present recommendations in preference order, either based on other users' top selections (across all users or across users with similar profiles or viewing histories), or based on profiles stored for the current user.

The recommendations (136, 138, 140, 142, 144) can be ranked in accordance with viewer preferences, rather than channel numbers, and the recommendations can be across all media and content available to the content distribution system, including terrestrial television, cable, satellite, personal video recorder (PVR)-recorded shows, pay-per-view (PPV), video-on-demand (VOD), local PC-stored and others.

The alternatives presented could be for content items available immediately, or content available in the near future.

Figure 5:
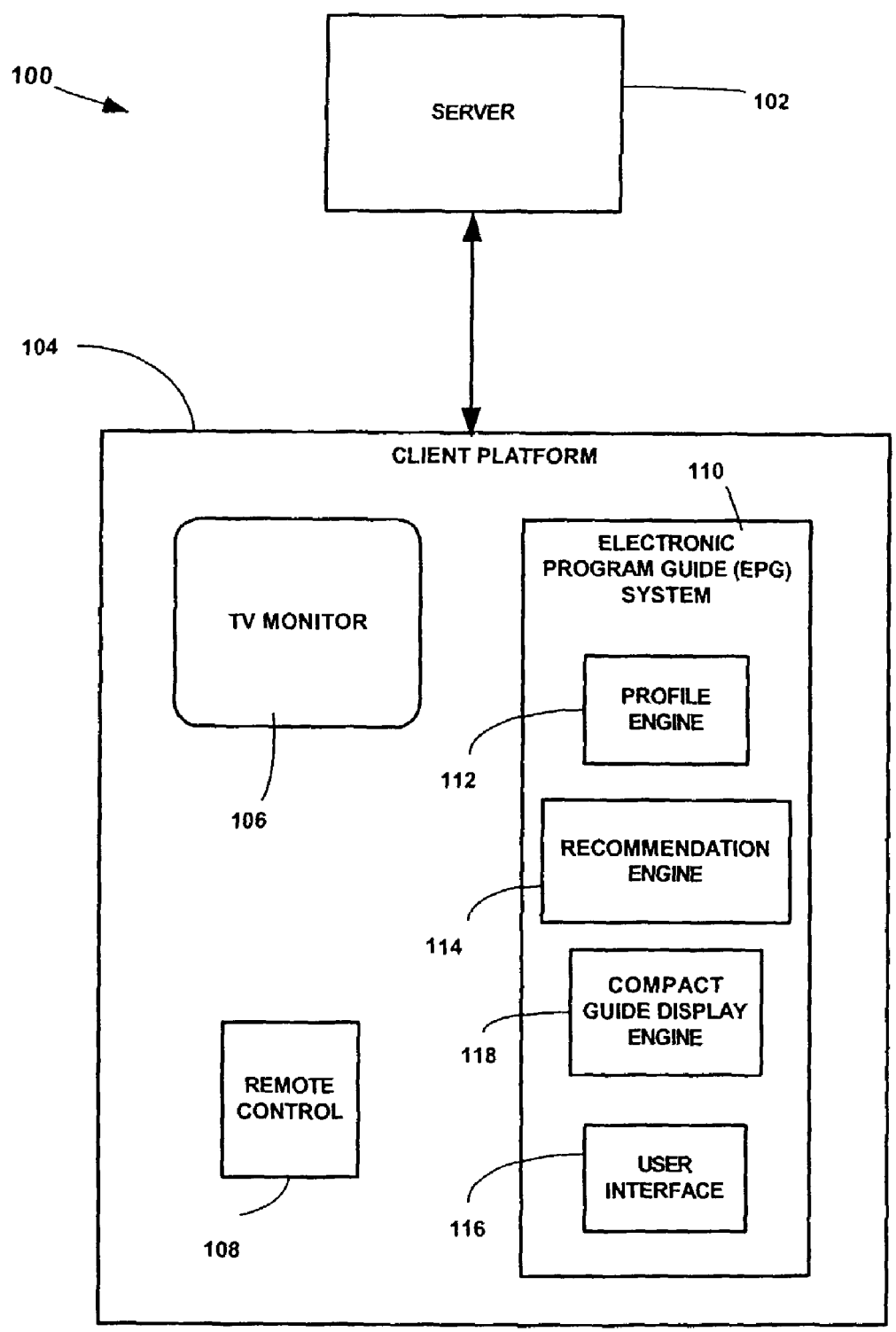
FIG. 5 is a block diagram showing a content distribution system incorporating the compact guide display engine and process of the present invention.

In one embodiment of the invention, as shown in FIG. 5, the compact guide display 134 is generated by a compact guide display engine 118, as shown in the content distribution system 100 of FIG. 5, which communicates with the recommendation engine 114 and user interface 116 of the otherwise conventional content distribution system 100.

Alternatively, the compact guide display 134 could be operated without the use of a recommendation engine 114, using various alternative selection criteria to select content items to be listed.

Having described the illustrated embodiments of the present invention, it will be apparent that modifications can be made without departing from the spirit and scope of the invention, as defined by the appended claims.

We claim:

1. A method comprising:

processing, by a processing device, ratings for a plurality of programming content items, a first portion of the programming content items being stored locally and a second portion of the programming content items being receivable via a network;

generating a guide display process to generate a listing of recommendations ranking the programming content items in accordance with the ratings;

responsive to the guide display process, causing display on a display screen, during display of a program, a guide display showing the listing of recommendations, the guide display being displayed as an overlay over a portion of the program, the guide display being sized and situated on the display screen so as to enable simultaneous viewing of the program and the listing of recommendations; and responsive to detecting hovering of an indicator over the overlay to indicate selection of one of the recommendations from the listing of recommendations presented on the display screen, causing opening of a picture-in-picture window providing instant viewing of a programming content item corresponding to the one of the recommendations selected from the listing while simultaneously causing continued display of the program.

2. The method of claim 1 further comprising:

causing display of additional information about the programming content item.

3. The method of claim 1 wherein the guide display is displayed as a translucent overlay over the portion of the program.

4. The method of claim 1 further comprising: receiving input to determine the placement, sizing, and display time of the guide display.

5. The method of claim 1, further comprising receiving input to toggle off and on the guide display.

6. The method of claim 1 wherein the guide display process automatically causes display of the guide display from time-to-time or periodically during a viewing session.

7. The method of claim 1 wherein the listing of recommendations shown by the guide display is based upon a single genre or category of programming content.

8. The method of claim 1 wherein the guide display is generated in response to information from a rating engine, recommendation engine or profile engine.

9. The method of claim 1 wherein the listing of recommendations shown by the guide display is in preference order.

10. The method of claim 1 wherein the listing of recommendations shown by the guide display is in preference order based on other viewers' top selections, the other viewers' top selections being generated across viewers with similar viewing histories.

11. The method of claim 1 wherein the listing of recommendations shown by the guide display is in preference order based on a stored viewer profile.

12. The method of claim 1 wherein the listing of recommendations shown by the guide display is ranked in accordance with viewer preferences rather than channel numbers.

13. The method of claim 1 wherein the guide display presents recommendations for programming content items available immediately or in the near future.

14. An apparatus comprising:

means for processing ratings for a plurality of programming content items, a first portion of the programming content items being stored locally and a second portion of the programming content items being receivable via a network;

means for generating a guide display process to generate a listing of recommendations ranking the programming content items in accordance with the ratings;

means, responsive to the guide display process, for displaying on a display screen, during display of a program, a guide display showing the listing of recommendations, the guide display being displayed as an overlay over a portion of the program, the guide display being sized and situated on the display screen so as to enable simultaneous viewing of the program and the listing of recommendations; and means, responsive to detecting hovering of an indicator over the overlay to indicate selection of one of the recommendations from the listing of recommendations presented on the display screen, for causing opening of a picture-in-picture window providing viewing of a programming content item corresponding to the one of the recommendations selected from the listing while simultaneously causing continued display of the program.

15. The apparatus of claim 14 further comprising:

means, operative in response to input, for causing display of additional information about the programming content item.

16. The apparatus of claim 14 wherein the guide display displaying means is operative to display the guide display as a translucent overlay over the portion of the program.

17. The apparatus of claim 14 wherein the guide display displaying means is further operative to receive input determining the placement, sizing, and display time of the guide display.

18. The apparatus of claim 14 wherein the guide display displaying means is further operative to receive input toggling on and off the guide display.

19. The apparatus of claim 14 wherein the guide display displaying means is operative to automatically cause display the guide display from time-to-time or periodically during a viewing session.

20. The apparatus of claim 14 wherein the guide display displaying means is operative to display the listing of recommendations based upon a single genre or category of programming content.

21. The apparatus of claim 14 wherein the guide display displaying means is operative to generate the guide display in response to information from a rating engine, a recommendation engine or a profile engine.

22. The apparatus of claim 14 wherein the guide display displaying means is operative to present the listing of recommendations in preference order.

23. The apparatus of claim 14 wherein the guide display displaying means is operative to present the listing of recommendations based upon other viewers' top selections, where the other viewers' top selections are based upon viewers with similar viewing histories.

24. The apparatus of claim 14 wherein the guide display displaying means is operative to present the listing of recommendations in preference order based upon a stored viewer profile.

25. The apparatus of claim 14 wherein the guide display displaying means is operative to rank the listing of recommendations in accordance with stored preferences rather than channel numbers.

26. The apparatus of claim 14 wherein the guide display displaying means is operative to present the listing of recommendations based upon immediately available programming content items or programming content items available in the near future.

27. An apparatus comprising:
a recommendation engine, implemented by a processing device, configured to process ratings for a plurality of programming content items, a first portion of the programming content items being stored locally and a second portion of the programming content items being receivable via a network;
a guide display engine implemented by the processing device, the guide display engine configured to:
generate a displayable listing of recommendations ranking the programming content items in accordance with the ratings and
cause display of a guide display showing the listing of recommendations on a display screen during display of a program, the guide display being displayed as an overlay over a portion of the program, the guide display being sized and situated on the display screen so as to enable viewing of the program while simultaneously permitting viewing of the listing of recommendations, wherein the processing device, responsive to detecting hovering of an indicator over the overlay to indicate selection of one of the recommendations from the listing of recommendations presented on the display screen, causes opening of a display window providing instant viewing of a programming content item corresponding to the one of the recommendations selected from the listing while simultaneously causing continued display of the program.

28. The apparatus of claim 27 wherein the guide display is a translucent overlay over the portion of the program.

29. The method of claim 1, wherein the listing of recommendations is displayed over the program as a translucent textual overlay without gridlines separating the recommendations.

30. A method comprising:
processing, by a processing device, ratings for a plurality of programming content items, a first portion of the programming content items being stored locally and a second portion of the programming content items being receivable via a network;
causing presentation of a listing of recommendations ranking the programming content items in accordance with the ratings and a user profile;
causing presentation, during display of a program, of a guide display showing the listing of recommendations, the guide display being displayed as an overlay over a portion of the program, the guide display being sized and situated on the display screen so as to enable simultaneous viewing of the program and the listing of recommendations, and wherein the guide display is automatically presented from time-to-time or periodically during the program; and
responsive to detecting hovering of an indicator proximate to one of the recommendations from the listing of recommendations presented on the display screen, causing opening of a picture-in-picture window presenting a programming content item corresponding to the one of the recommendations while simultaneously causing continued display of the program.

31. The method of claim 30, wherein listing of recommendations is ordered based upon other viewers' top selections, where the other viewers' top selections are based upon viewers with similar viewing histories.

* * * * *